US007280910B2

(12) United States Patent
Miyamoto et al.

(10) Patent No.: US 7,280,910 B2
(45) Date of Patent: Oct. 9, 2007

(54) ENGINE PROTECTION METHOD AND APPARATUS, AND ENGINE POWER CONTROL METHOD AND APPARATUS FOR CARGO HANDLING VEHICLE

(75) Inventors: Yoshiji Miyamoto, Tokyo (JP); Toshihiro Kobayashi, Tokyo (JP)

(73) Assignee: Nissan Motor Co., Ltd., Kanagawa (JP)

( * ) Notice: Subject to any disclaimer, the term of this patent is extended or adjusted under 35 U.S.C. 154(b) by 582 days.

(21) Appl. No.: 10/861,591

(22) Filed: Jun. 4, 2004

(65) Prior Publication Data

US 2004/0245034 A1 Dec. 9, 2004

(30) Foreign Application Priority Data

| | | | |
|---|---|---|---|
| Jun. 5, 2003 | (JP) | ............................. | 2003-160542 |
| Jun. 6, 2003 | (JP) | ............................. | 2003-161560 |
| Jun. 6, 2003 | (JP) | ............................. | 2003-161604 |

(51) Int. Cl.

| | |
|---|---|
| ***G06F 19/00*** | (2006.01) |
| ***F02D 11/10*** | (2006.01) |
| ***F02D 31/00*** | (2006.01) |
| ***F02M 51/00*** | (2006.01) |

(52) U.S. Cl. ...................... 701/114; 123/350; 123/396; 123/479; 701/29

(58) Field of Classification Search ............ 123/41.15, 123/332–335, 342, 350, 352, 396, 479, 198 D; 701/29, 54, 114
See application file for complete search history.

(56) References Cited

U.S. PATENT DOCUMENTS

| | | | | |
|---|---|---|---|---|
| 3,923,020 | A * | 12/1975 | Gilligan | 123/342 |
| 4,474,155 | A * | 10/1984 | Sagues | 123/333 |
| 4,475,502 | A * | 10/1984 | Matsumoto | 123/198 D |
| 6,349,252 | B1 * | 2/2002 | Imanishi et al. | 701/29 |
| 6,848,956 | B2 * | 2/2005 | Ozawa | 440/1 |
| 7,047,943 | B1 * | 5/2006 | Kanno | 123/479 |
| 2004/0245034 | A1 * | 12/2004 | Miyamoto et al. | 123/396 |

* cited by examiner

*Primary Examiner*—Willis R. Wolfe, Jr.

(57) ABSTRACT

A method and an apparatus for protecting an engine are disclosed which are capable of preventing damage to the engine or associated parts thereof. The engine is provided with an electronic control fuel injection system. A quasi-abnormality of at least one of variables in connection with the engine and the associated parts thereof, such as an engine cooling water, a fuel pressure or the like is detected by a sensor. When the quasi-abnormality of the variable and such a quasi-abnormal state lasts for a predetermined period of time, a throttle opening of an electronic control throttle is regulated so as to limit an engine rotational speed to a low rate.

10 Claims, 9 Drawing Sheets

ENGINE PROTECTION METHOD AND APPARATUS, AND ENGINE POWER CONTROL METHOD AND APPARATUS FOR CARGO HANDLING VEHICLE

BACKGROUND OF THE INVENTION

1. Field of the Invention

The present invention relates to an engine protection method and apparatus, and an engine power control method and apparatus for a cargo handling vehicle, and more particularly to an engine protection method and apparatus which can automatically prevent an engine from being damaged due to overheat of the engine in a cargo handling vehicle such as a fork lift truck or the like, or which can prevent an engine associated part from being damaged in the case where a supplied petroleum gas fuel becomes a low fuel pressure in a single point injection (SPI) type internal combustion engine having a fuel injector arranged on an upstream side of a collector portion of an intake manifold of the engine, and an engine power control method and apparatus for a cargo handling vehicle constructed to restrict a maximum speed, which control method and apparatus can control an engine rotational speed so that a shaft torque becomes maximum at the time of cargo handling.

2. Description of the Related Art

In a conventional cargo handling vehicle such as a fork lift truck, a warning light is provided in a driver's stand panel, so that in the case where an engine overheats, a warning is given by turning on the warning light. Further, there has been a cargo handling control apparatus for a fork lift truck which controls an opening of a throttle valve so that an engine is brought into an idle state when a temperature of an engine cooling water is increased to the outside of a proper temperature range for operation. In the idle state, the throttle valve is closed while a small amount of a fuel is supplied from a small hole formed on the engine side, whereby the engine is maintained in a low speed rotation state, as disclosed in, for example, Japanese Patent Laid-Open Publication No. 4-231628.

In the prior art mentioned above, in the case of the overheat being warned by the warning light, in the case where the driver is not aware of lighting of the warning light and leaves the engine as it is, there is a possibility that the engine is damaged due to the overheat, so that it is necessary that the driver always pays attention to the warning light. Further, in the latter prior art, since the engine is held in the idle state, an air intake amount is substantially shut off, and the engine is kept in a state where the fuel is cut. Accordingly, it is possible to prevent the engine from being damaged due to the overheat, however, when the engine rapidly stops, a lot of time is required for eliminating the overheat, so that there is a possibility that the cargo handling work with time constraints is adversely affected.

Further, conventionally, there have been an SPI system in which a fuel injector is placed on an upstream side of a collector portion of an intake manifold of the engine so as to supply a fuel to each of the cylinders, and a multi point injection (MPI) system in which fuel injectors are provided in respective cylinders to supply fuel to the respective cylinders. The latter is common at the present time, however, the SPI system is used in some of engines at the present time for the reason of cost and simple structure as compared to the MPI system, and is frequently used in engines for fork lift trucks.

The fuel includes gasoline, a light oil and a liquefied petroleum gas (LPG). In the case where the liquefied petroleum gas is employed and the petroleum gas fuel is supplied to the engine by the SPI system, the supply of the petroleum gas fuel is carried out by utilizing a vapor pressure within a gas cylinder and adjusting the pressure to an injection pressure of about 0.3 kgf/cm$^2$ by means of a vaporizer. Thus, in the case of the liquefied petroleum gas, no fuel pump is used.

The liquefied petroleum gas for an engine fuel is distributed as a mixed gas of a propane ($C_3H_8$) component and a butane ($C_4H_{10}$) component. A pressure of the mixed gas within a gas cylinder varies between 0.6 and 13.0 kgf/cm$^2$ depending on a temperature and a mixture ratio thereof, and a fuel pressure tends to reduce due to properties of a vaporizer at a high flow rate.

Accordingly, if the fuel pressure is less than 0.26 kgf/cm$^2$, it is impossible to satisfy a required amount of the gas fuel to be injected, so that a misfire, a backfire or the like due to a lean gas is generated, and that an exhaust gas temperature is increased to cause damage to a catalyst. Therefore, in the case where the fuel pressure is equal to or less than a certain level, it is necessary to carry out a rotation control and a throttle opening control so as to prevent a flow rate of the gas fuel from being insufficient.

As one example of the rotation control, Japanese Patent Application Laid-Open Publication No. 11-21054 discloses or suggests a method of controlling a fuel leaning, an engine knocking and the like at a low fuel pressure in a direct-injection engine using gasoline as a fuel, which engine is different from the engine using the liquefied petroleum gas mentioned above. Since in the direct-injection engine, fuel injection is carried out in a later stage of a compression stroke in which a pressure within a combustion chamber is very high, it is necessary to supply the fuel at a high pressure to a fuel injection valve. Accordingly, in addition to a motor-driven low pressure pump disposed within a fuel tank for pumping the fuel toward the fuel injection valve, the engine is provided with a high pressure pump which further pressurizes the fuel from the low pressure pump so as to supply the fuel to the fuel injection valve.

Since the high pressure pump is driven by a cam shaft of the direct-injection engine, the discharge amount of the high pressure fuel is increased with an increase of an engine rotational speed, whereas, since the low pressure pump is driven by a motor, the discharge amount is fixed regardless of the engine rotational speed.

Accordingly, it is necessary that the discharge amount of the low pressure pump has a sufficient margin in comparison with a maximum discharge amount of the high pressure pump at the allowable highest rotational speed of the direct-injection engine. However, if the discharge amount of the low pressure pump decreases due to a reduction in supply voltage or the like, the fuel supplied to the combustion chamber becomes lean, so that there is a possibility that an engine knocking is caused by overheat of the combustion chamber.

This can be solved by making the low pressure pump have a very large capacity, however, there will be problems of an increase in weight and electric power consumption, and the like. Accordingly, Japanese Patent Application Laid-Open Publication No. 11-21054 has proposed an apparatus which is made as compact as possible and which is constructed so as to prevent a fuel leaning and an engine knocking from being generated.

However, the conventional example mentioned above is an approach to solving the problem in the case of the direct-injection engine using gasoline as a fuel. Since the low fuel pressure problem raised in the SPI type engine using a liquefied petroleum gas is absolutely different in cause, the conventional approach is not applicable to such an SPI type engine, resulting in a change of perspective being required to solve the problem.

As a method of preventing the engine rotational speed from being increased to a certain level or more, there are measurements such as a fuel cut, an ignition cut and the like, however, there is a possibility that a lean combustion of an air-fuel mixture and an increase of a catalyst temperature are caused.

In the case of the fuel cut, since the fuel is left within an intake manifold just after the fuel cut, the combustion in a fuel cut state is not immediately carried out, but the lean combustion is induced instead.

Further, in the case where the fuel pressure of the petroleum gas decreases, the amount of the fuel gas in the same injection time decreases, so that the same phenomenon occurs. In this case, since the combustion within a catalytic converter is generated due to a mis-ignition within the engine combustion chamber, there is a possibility that the catalyst is damaged and a backfire in the intake manifold is generated due to restriction of a combustion speed.

Further, the increase of the catalyst temperature is caused by combustion within the catalyst in the case where the mis-ignition occurs due to the lean fuel, and the air-fuel mixture flows into an exhaust pipe. Also, in the case where the ignition cut is carried out, the air-fuel mixture flows into the exhaust pipe, so that there is a possibility of the same result.

In a conventional industrial vehicle such as a cargo handling vehicle or the like, an engine drives drive wheels as well as a hydraulic pump so as to carry out a cargo handling work with a cargo handling cylinder actuated by a pressurized fluid discharged from the hydraulic pump. The cargo handling vehicle is provided with an accelerator pedal so that a traveling speed is changed in correspondence to a depressing angle of the accelerator pedal or an accelerator pedal angle. Further, the cargo handling vehicle is provided with a maximum vehicle speed control apparatus for controlling a maximum rotational speed of the engine so as to control a maximum vehicle speed, for the purpose of accident prevention during traveling on the premises or yard of the plant. For example, in order to prevent the vehicle speed corresponding to a target rotational speed of the engine from exceeding the maximum vehicle speed, the maximum vehicle speed control apparatus is constructed in such a manner that a throttle opening is fixed even when the depressing amount of the accelerator pedal is made large, whereby the rotational speed of the engine is controlled to restrict the vehicle speed.

Further, a certain type of cargo handling vehicle, as disclosed in, for example, Japanese Patent Application Laid-Open Publication No. 2001-278599, is provided with an optical sensor for detecting an illuminance in the cargo handling yard, to thereby reduce the traveling speed in the case where the cargo handling yard is dark. For example, as shown in FIG. 11A, optical sensors 55 are mounted to an upper surface of a head guard 52 of a cargo handling vehicle 51, a top and both side surfaces of masts 53 and both side portions of a driver's stand panel 54, respectively, whereby the vehicle speed is controlled by comprehending the illuminance in the environment by means of a control apparatus on the basis of an amount of light detected by the optical sensors 55. As shown in FIG. 11B, when the control apparatus of the cargo handling vehicle 51 determines the illuminance in the environment, wherein the illuminance is more than a predetermined threshold value TH, the vehicle speed is not limited and permitted to reach a limit speed M, whereas, when the illuminance in the environment is equal to or less than the predetermined threshold value TH, the maximum vehicle speed is limited in proportion to the illuminance. For example, when the illuminance in the environment is S, the maximum vehicle speed is limited to N.

However, in the conventional cargo handling vehicle, since the drive wheels are driven by the engine and the cargo handling cylinder is actuated by the pressurized fluid discharged from the hydraulic pump driven by the engine, the maximum rotational speed of the engine is limited in the case where the cargo handling work yard is dark, with the result that a torque required for the cargo handling work can not be obtained, to thereby pose a problem for the cargo handling work.

SUMMARY OF THE INVENTION

The present invention has been made in view of the problems mentioned above. Accordingly, it is an object of the present invention to provide a method and an apparatus for protecting an engine, which are capable of preventing damage to the engine or associated parts thereof.

It is another object of the present invention to provide an overheat preventing method and apparatus for an engine, which are capable of automatically preventing damage to the engine due to overheat by restricting an engine rotational speed before the engine overheats.

It is still another object of the present invention to provide a protection method and apparatus for an engine which employs a liquefied petroleum gas as a fuel to be supplied by an SPI system and which is provided with an electronic control throttle, wherein the method and apparatus are capable of preventing damage to the engine or associated parts thereof at a low fuel pressure.

It is a further object of the present invention to provide an engine power control method and apparatus for a cargo handling vehicle having a maximum speed limiting means, which are capable of making a shaft torque maximum by increasing a rotational speed of the engine at the time of a cargo handling work.

In accordance with an aspect of the present invention, a method of protecting an engine which is provided with an electronic control fuel injection system is provided. The method comprises the steps of: detecting a quasi-abnormality of at least one of variables in connection with the engine and parts associated with the engine; and when the quasi-abnormality of the at least one of the variables is detected and lasts for a predetermined period of time, regulating a throttle opening of an electronic control throttle, to thereby limit an engine rotational speed to a low rate.

In a preferred embodiment of the present invention, the at least one of the variables is a temperature of an engine cooling water, and the quasi-abnormality thereof is a state that the temperature of the engine cooling water is not less than a predetermined temperature.

In a preferred embodiment of the present invention, the method further comprises the step of freeing the regulation of the throttle opening of the electronic control throttle when an abnormality of the temperature of the engine cooling water has been avoided, so that a control mode is changed over to fuel injection control using the electronic control fuel injection system.

In a preferred embodiment of the present invention, the at least one of the variables is a fuel pressure, and the quasi-abnormality thereof is a state that the fuel pressure is equal to or less than a predetermined pressure.

In accordance with another aspect of the present invention, a method of protecting an engine from overheating, which engine is provided with an electronic control fuel injection system, is provided. The method comprises the steps of: detecting a temperature of an engine cooling water and judging whether or not the detected temperature is equal to or higher than a predetermined temperature; and when the detected temperature is equal to or higher than the predetermined temperature and such a high temperature state lasts for a predetermined period of time, regulating a throttle opening of an electronic control throttle, to thereby limit an engine rotational speed to a predetermined low rate.

According to the method thus constructed, the throttle valve of the electronic control throttle is throttled stepwise so as to reduce the engine rotational speed to the predetermined low rate, to thereby prevent the engine from overheating. Though the temperature of the engine cooling water is constantly monitored, the predetermined temperature does not correspond to a temperature at which the engine overheats but is a temperature near a temperature at which the engine is likely to overheat. Therefore, when the temperature of the engine cooling water is kept at or below such a predetermined temperature, the engine will not overheat, with the result that a normal traveling or cargo handling can be performed without any damage caused to the engine.

In a preferred embodiment of the present invention, the method further comprises the step of freeing the regulation of the throttle opening of the electronic control throttle when an abnormality of the temperature of the engine cooling water has been avoided, so that a control mode is changed over to fuel injection control using the electronic control fuel injection system.

In accordance with still another aspect of the present invention, a method of protecting an engine at a low fuel pressure is provided, in which engine a fuel injector is disposed in an air intake passage on an upstream side of a collector portion of an intake manifold of the engine so that a petroleum gas fuel is supplied to a plurality of cylinders of the engine by fuel injection from the fuel injector, and an electronic control throttle is disposed in the air intake passage. The method comprises the steps of: receiving information in regard to an engine rotational speed, a fuel pressure, a throttle opening, and an angle of an accelerator pedal by means of an engine control unit; and when the fuel pressure becomes equal to or less than a predetermined pressure, regulating a throttle opening of the electronic control throttle, to thereby limit the engine rotational speed to a low rate.

According to the method of the present invention thus constructed, the throttle opening of the electronic control throttle is regulated to limit the engine rotational speed to a low rate when the fuel pressure becomes equal to or less than a predetermined pressure. Such construction can prevent the fuel from becoming lean, to thereby protect the engine and prevent a catalyst within an exhaust pipe from being damaged.

In accordance with a further aspect of the present invention, an engine power control method for a cargo handling vehicle including an engine which is provided with an electronic control throttle so as to regulate a throttle opening of the electronic control throttle, to thereby restrain a maximum speed of the vehicle, is provided. The method comprises the steps of: detecting a speed of the vehicle; determining, based on the detected speed of the vehicle, whether the vehicle is in a cargo handling state, wherein it is determined that the vehicle is in the cargo handling state when the detected speed of the vehicle is at zero; and releasing the regulation of the throttle opening of the electronic control throttle when it has been determined that the cargo handling vehicle is in the cargo handling state, to thereby maximize a shaft torque of the engine.

According to the engine power control method thus constructed, when the detected vehicle speed is at zero, it is determined that the vehicle is in the cargo handling state, so that the regulation of the throttle opening of the electronic control throttle is released so as to permit the shaft torque of the engine to be maximized, resulting in a shortage of output power of the engine being prevented during cargo handling. The maximum rotational speed of the engine is changed over and controlled between the time of traveling and the time of cargo handling, so that the shaft torque of the engine can be maximized by increasing the engine rotational speed even when the cargo handling work yard is dark. Therefore, the output power of the engine required for cargo handling can be obtained in response to an operation of the accelerator pedal, resulting in the cargo handling work being carried out as desired.

In accordance with a still further aspect of the present invention, an apparatus for protecting an engine from overheating is provided. The apparatus comprises: an electronic control fuel injection system including an electronic control throttle; a detecting means for detecting a temperature of an engine cooling water; a judgment means for judging whether or not the temperature detected by the detecting means is equal to or higher than a predetermined temperature and such a high temperature state lasts for a predetermined period of time, to thereby determine a condition for commencing restriction of an engine rotational speed; a throttle opening control means for regulating a throttle opening of the electronic control throttle so as to make an actual rotational speed of the engine reach an overheat preventing rotational speed when the condition for commencing the restriction of the engine rotational speed is established; and a changing means for releasing the throttle opening control means from the regulation of the throttle opening of the electronic control throttle and changing over a control mode to fuel injection control using the electronic control fuel injection system when an abnormality of the temperature of the engine cooling water has been avoided by the throttle opening control means in such a manner that the throttle opening is regulated to reduce a flow rate of an intake airflow and decrease the engine rotational speed to the overheat preventing rotational speed.

According to the apparatus thus constructed, the detecting means constantly monitors the temperature of the engine cooling water, wherein when the judgment means judges that the temperature detected by the detecting means is equal to or higher than the predetermined temperature and such a high temperature state lasts for a predetermined period of time, to thereby determine a condition for commencing restriction of the engine rotational speed, the throttle valve of the electronic control throttle is throttled stepwise by the throttle opening control means so as to reduce an amount of intake air and thus reduce the engine rotational speed to a predetermined level, to thereby prevent from the engine overheating. Therefore, the engine will not overheat, to thereby permit a normal traveling or cargo handling to be performed without any damage caused to the engine.

In a preferred embodiment of the present invention, the apparatus further comprises an engine rotational speed detecting means for detecting an actual rotational speed of the engine; wherein the throttle opening control means is adapted to regulate the throttle opening of the electronic control throttle in such a manner that the overheat preventing rotational speed is set to a target rotational speed to which the actual rotational speed of the engine detected by the engine rotational speed detecting means is set.

In accordance with another aspect of the present invention, a protecting apparatus for an engine at a low fuel pressure is provided, in which engine a fuel injector is disposed in an air intake passage on an upstream side of a collector portion of an intake manifold of the engine so that a petroleum gas fuel is supplied to a plurality of cylinders of the engine by fuel injection from the fuel injector, and an electronic control throttle is disposed in the air intake passage. The apparatus comprises: an engine speed detecting means for detecting an engine rotational speed; a pressure sensor for detecting a pressure of the petroleum gas fuel supplied to the fuel injector; a throttle position sensor for detecting a throttle opening of the electronic control throttle; an accelerator pedal angle sensor disposed on an accelerator pedal of the engine; and an engine control unit connected to the engine speed detecting means, pressure sensor, throttle position sensor and accelerator pedal angle sensor, for receiving information in regard to the engine rotational speed, the fuel pressure, the throttle opening and the angle of the accelerator pedal; wherein when the fuel pressure detected by the pressure sensor becomes equal to or less than a predetermined pressure, the engine control unit regulates the throttle opening of the electronic control throttle, to thereby limit the engine rotational speed to a low rate.

According to the apparatus of the present invention thus constructed, the throttle opening of the electronic control throttle is regulated to limit the engine rotational speed to a low rate when the pressure sensor detects the fuel pressure becomes equal to or less than a predetermined pressure. Such construction can prevent the fuel from becoming lean, to thereby protect the engine and prevent the catalyst within the exhaust pipe from being damaged.

In accordance with yet another aspect of the present invention, an engine power control apparatus for a cargo handling vehicle including an engine which is provided with an electronic control throttle so as to regulate a throttle opening of the electronic control throttle, to thereby restrain a maximum speed of the vehicle, is provided. The apparatus comprises: a speed detecting means for detecting a speed of the vehicle; and a determining means for determining, based on an output of the speed detecting means, whether the vehicle is in a cargo handling state, wherein the determining means determines that the vehicle is in the cargo handling state when the output of the speed detecting means indicates the speed of the vehicle is at zero; wherein when the determining means determines that the cargo handling vehicle is in the cargo handling state, the regulation of the throttle opening of the electronic control throttle is released so as to maximize a shaft torque of the engine.

According to the engine power control apparatus thus constructed, when the speed detecting means detects the vehicle speed is at zero, the determining means determines that the vehicle is in the cargo handling state, so that the regulation of the throttle opening of the electronic control throttle is released so as to maximize the shaft torque of the engine, resulting in a shortage of output power of the engine being prevented during cargo handling. It is preferable that the speed detecting means be constructed to utilize a vehicle speed sensor detecting a rotation of a drive shaft which drives drive wheels, to thereby securely detect the speed of the vehicle is at zero.

In a preferred embodiment of the present invention, the engine power control apparatus further comprises: a maximum speed control means for controlling the throttle opening of the electronic control throttle to restrain the maximum speed of the vehicle; and a changing and controlling means for releasing the maximum speed control means from restraining of the maximum speed of the vehicle when the determining means determines that the cargo handling vehicle is in the cargo handling state, so that the regulation of the throttle opening of the electronic control throttle is released.

DETAILED DESCRIPTION OF THE INVENTION

Now, the present invention will be described in detail hereinafter with reference to the accompanying drawings.

Figure 1:
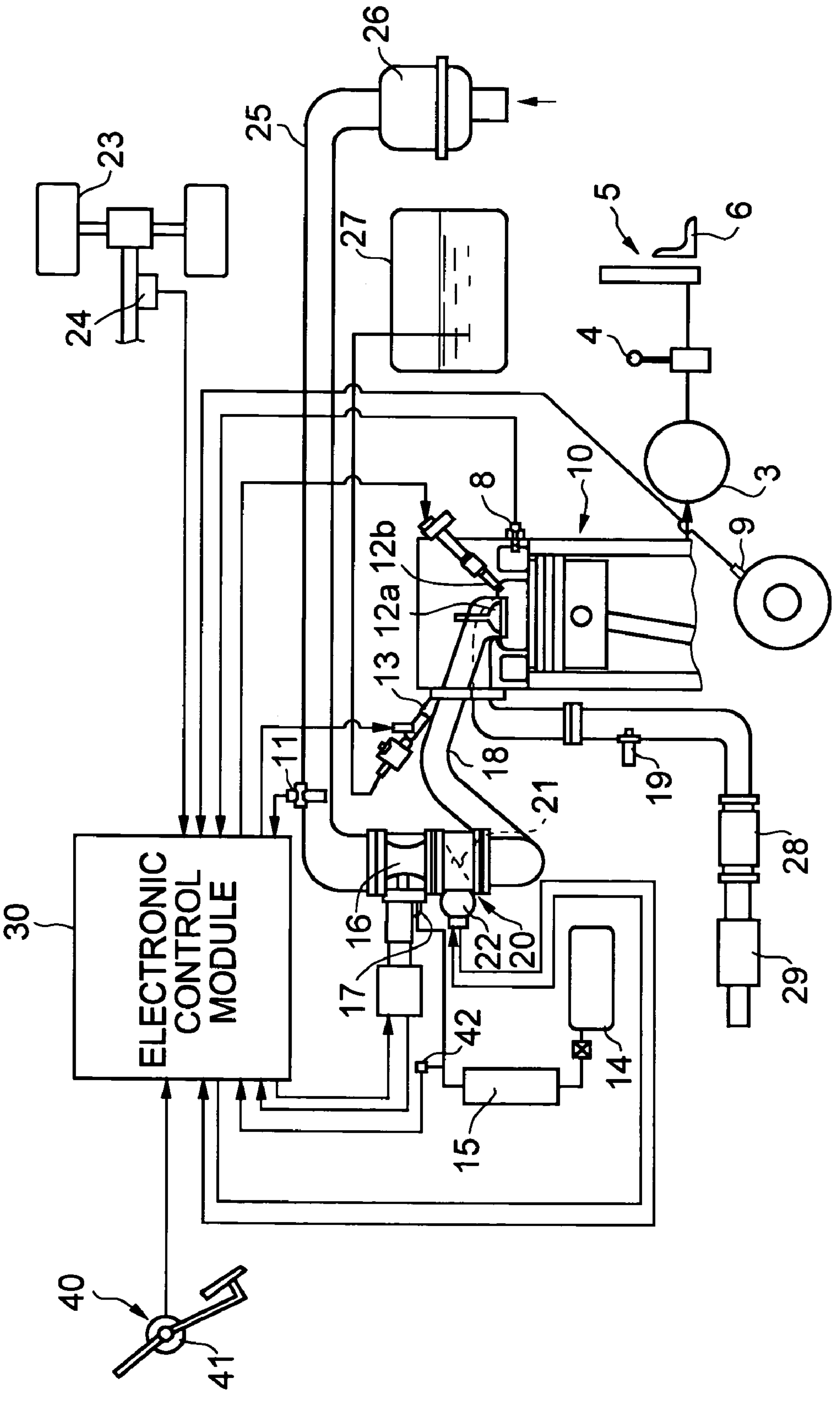
FIG. 1 is a schematic diagram showing an embodiment wherein the present invention is used to advantage.

Referring first to FIG. 1, an embodiment of a cargo handling vehicle is illustrated, wherein the present invention is used to advantage.

The cargo handling vehicle includes an engine 10 which selectively utilizes gasoline or a liquefied petroleum gas (LPG) as a fuel and which is adapted to drive drive wheels 23 and actuate a hydraulic pump 3 so as to carry out a cargo handling work by operating a cargo handling lever 4, thereby introducing a discharged pressurized fluid to a cargo handling cylinder and vertically moving a fork 6 in a mast 5, as shown in FIG. 1.

The engine 10 is provided with a fuel supply system for gasoline or a liquefied petroleum gas (LPG) as a fuel, an intake system feeding air required for combustion, and an exhaust system discharging a combustion gas to the atmosphere, and is provided with an electronic control system for controlling fuel injection into a plurality of cylinders of the engine 10. The fuel supply system (gasoline) includes a fuel supply pipe extending from a fuel tank 27 and connected to fuel injectors 13 attached to one end portion of an intake manifold 18. The fuel supply system (LPG) includes a fuel supply pipe extending from a gas cylinder 14 via a vaporizer 15 and connected to a fuel injector 17 attached to a venturi pipe 16. One end of the intake manifold 18 is connected to the engine 10 and another end of the intake manifold 18 has the venturi pipe 16 and an electronic control throttle 20 connected thereto on an upstream side of a collector portion thereof. An oxygen sensor 19 is provided in a pipe of the exhaust system. A catalytic converter 28 and a muffler 29 for purifying the combustion gas are attached to the pipe of the exhaust system. The intake system includes an intake pipe 25 which has an air filter 26 provided at one end thereof and the venturi pipe 16 connected to another end thereof. An air flowmeter 11 is provided in the intake pipe 25. Further, the engine 10 is provided with intake valves 12*a*, ignition plugs 12*b*, a temperature sensor 8 for detecting a temperature of an engine cooling water, and the like.

Figure 2:
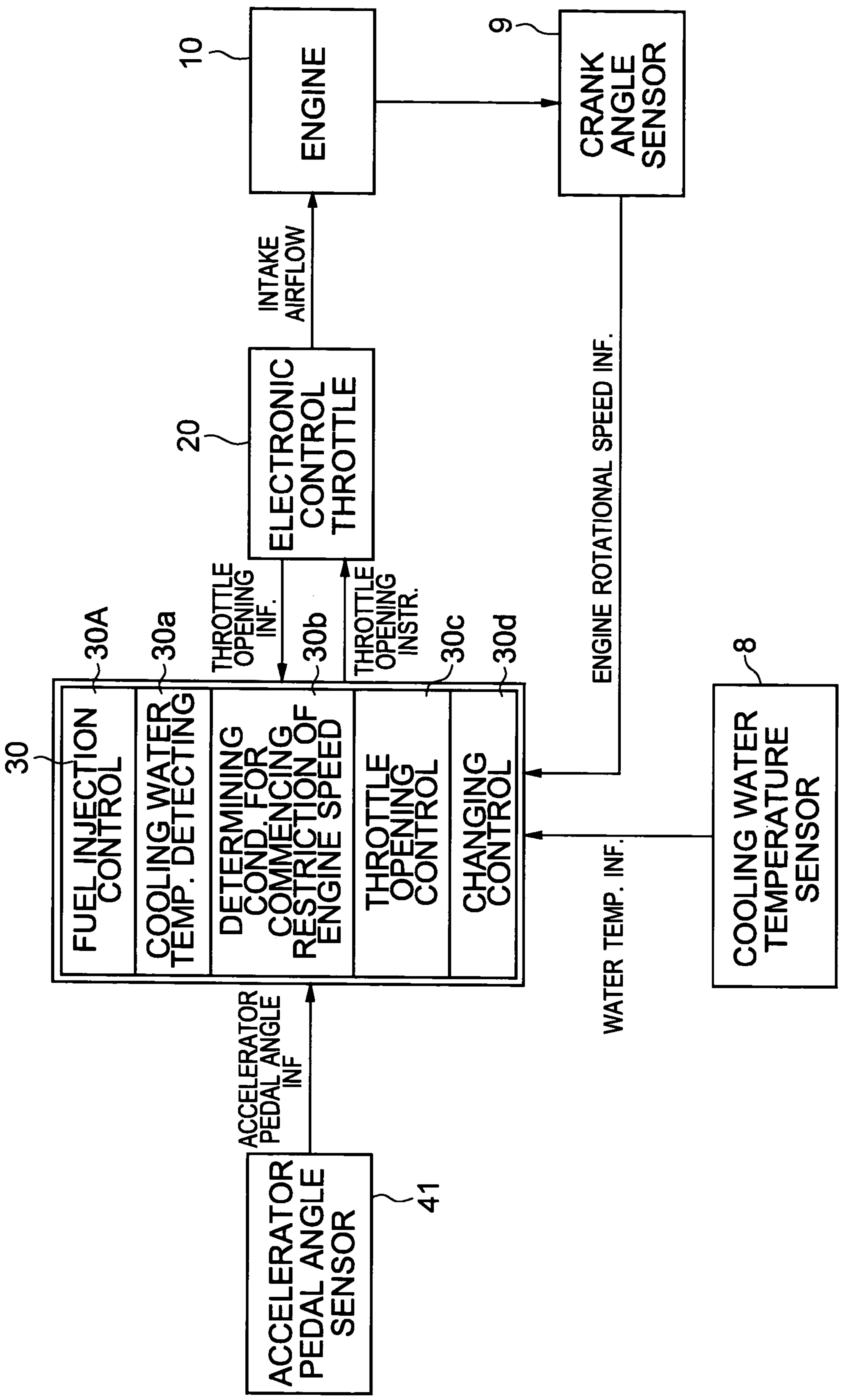
FIG. 2 is a block diagram showing an example of a control apparatus for executing a governor rotation control method for preventing overheat in accordance with the present invention.

The electronic control system includes an electronic control module (ECM) or engine control apparatus 30 provided therein with a fuel injection control means 30A (FIG. 2). The fuel injection control means 30A controls drive of the fuel injectors 13 and 17 on the basis of an air intake amount detected by the air flowmeter 11 and an engine rotation signal detected by a crank angle sensor 9, and controls a throttle opening of a throttle valve 21 of the electronic control throttle 20 on the basis of a throttle opening signal detected by a throttle position sensor 22, an accelerator pedal angle signal detected by an accelerator pedal angle sensor 41 of an accelerator pedal 40, and the like. A petroleum gas pressure sensor 42 is coupled to the fuel supply pipe between the vaporizer 15 and the fuel injector 17 so as to detect a fuel pressure of the petroleum gas and input a fuel pressure signal to the control apparatus 30. Further, a vehicle speed sensor 24 is provided at a suitable position for detecting a rotation of a drive shaft driving the drive wheels 23, so that a rotation signal caused by the rotation of the drive shaft is input to the control apparatus 30, whereby a vehicle speed is detected.

A description will be given below of an embodiment of a governor rotation control apparatus for preventing overheat in accordance with the present invention with reference to FIGS. 2 to 5 as well as FIG. 1.

In a governor rotation control apparatus for preventing overheat in the illustrated embodiment, an electronic control fuel injection system including an electronic fuel injection control means 30A is attached to the engine 10. As shown in FIG. 2, in the engine 10, the throttle opening of the throttle valve 21 of the electronic control throttle 20 is adjusted, and a fuel injection amount is controlled in correspondence to an air flow rate. The air flow rate is controlled on the basis of accelerator pedal angle information from the accelerator pedal angle sensor 41 of the accelerator pedal 40. Throttle opening information with respect to the electronic control throttle 20 is input to the electronic control module (ECM) or control apparatus 30. With respect to a rotational speed of the engine 10, a crank angle signal from the crank angle sensor 9 is input to the control apparatus 30, whereby engine rotational speed information is obtained. Further, a signal from the temperature sensor 8 detecting the temperature of the engine cooling water is input to the control apparatus 30, whereby engine cooling water temperature information is obtained. The control apparatus 30 is provided with a function of preventing overheat of the engine 10.

The electronic control throttle 20 is constituted by the throttle valve 21 driven by a throttle motor, and the throttle position sensor 22 provided in a rotation shaft of the throttle valve 21. A throttle opening signal is input to the control apparatus 30 from the throttle position sensor 22, and an accelerator pedal angle signal detected by the accelerator pedal angle sensor 41 of the accelerator pedal 40 is input to the control apparatus 30. A throttle opening instruction from the control apparatus 30 is input to the throttle motor of the electronic control throttle 20, whereby the throttle opening of the throttle valve 21 is controlled. The control apparatus 30 controls the fuel injection amount from the fuel injectors 13 or fuel injector 17 in such a manner that air is supplied to the engine 10 at a flow rate in correspondence to the throttle opening of the electronic control throttle 20 so as to attain an optimum air fuel ratio. In general, a relationship between the engine rotational speed and the fuel injection amount is kept in a fixed one.

The control apparatus 30 is provided with the fuel injection control means 30A which is a conventional one. The control apparatus 30 is also provided with a water temperature detecting means 30*a*, means for determining a condition for commencing restriction of an engine rotational speed 30*b* (also merely referred to as determining means 30*b*), a throttle opening control means 30*c*, and a changing control means 30*d* for changing a fuel injection mode.

The water temperature detecting means 30*a* is adapted to detect the temperature of the engine cooling water in the engine 10 on the basis of an output signal of the temperature sensor 8 inputted to the control apparatus 30. The determining means 30*b* is adapted to determine or judge whether or not the temperature detected by the water temperature detecting means 30*a* is equal to or higher than a predetermined temperature and such a high temperature state lasts for a predetermined period of time. In this connection, the predetermined temperature is set to such a temperature near a temperature at which overheat of the engine is likely to occur that keeping the temperature of the engine cooling water below the predetermined temperature can be prevent overheat of the engine. The throttle opening control means 30*c* is adapted to regulate a flow rate of an intake airflow by throttling stepwise the throttle valve 21 of the electronic control throttle 20 in the case where the condition for commencing the restriction of the engine rotational speed by the determining means 30*b* is established, to thereby limit the engine rotational speed to a predetermined low rate or an overheat preventing regulated rotational speed. This control mode is referred to as an overheat prevention mode. The changing control means 30*d* is adapted to free or release the throttle opening control means 30*c* from the regulation of the throttle opening of the electronic control throttle 20 and change over a control mode from the overheat prevention mode to a normal fuel injection control mode using the electronic control fuel injection system when an abnormality of the temperature of the engine cooling water has been avoided by the throttle opening control means 30*c* in such a manner that the throttle opening is regulated to reduce the flow rate of the intake airflow and decrease the engine rotational speed to the overheat preventing regulated rotational speed, and vice versa.

Figure 3:
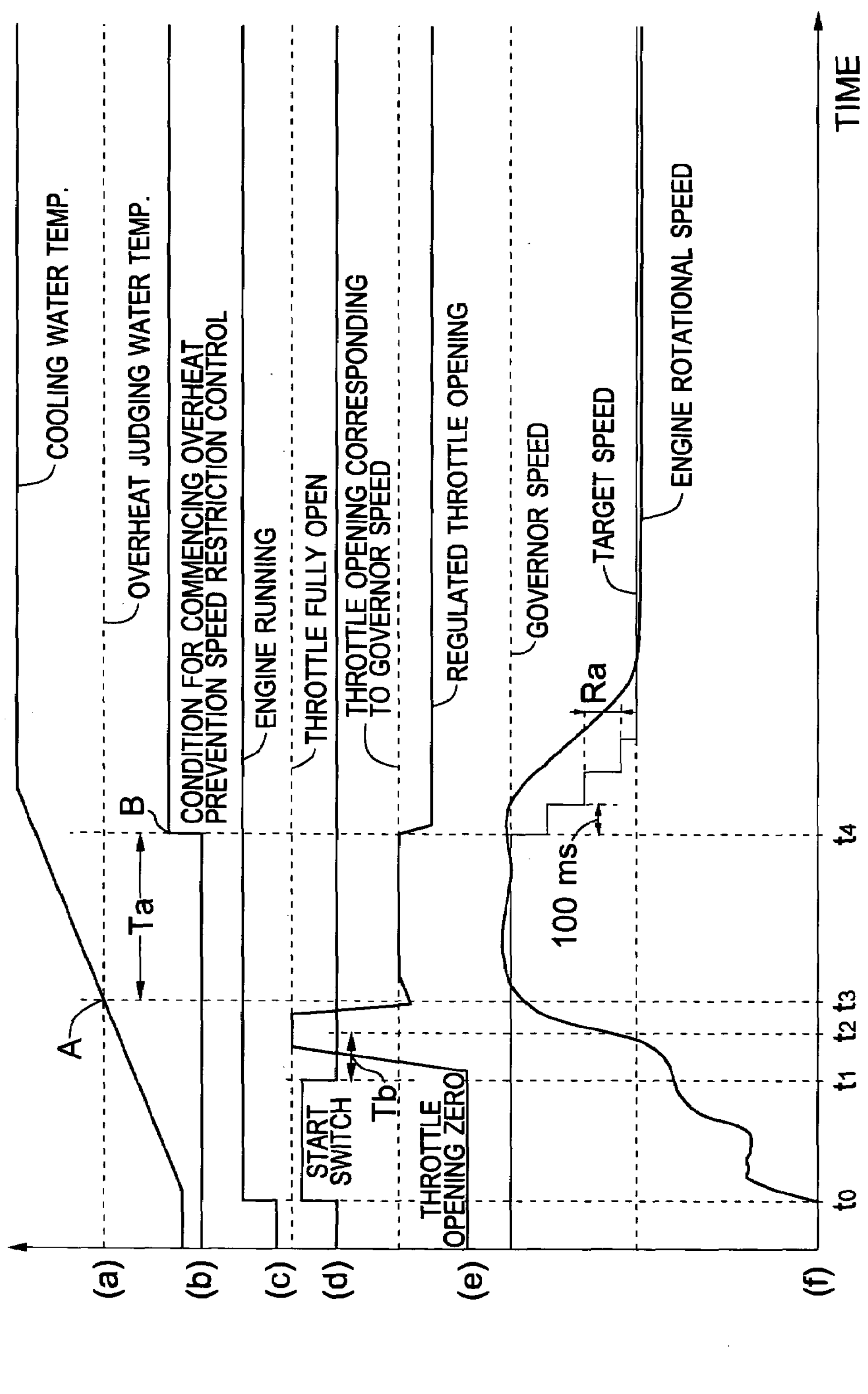
FIG. 3 is a timing chart illustrating the governor rotation control for preventing overheat in accordance with the invention.
Figure 4:
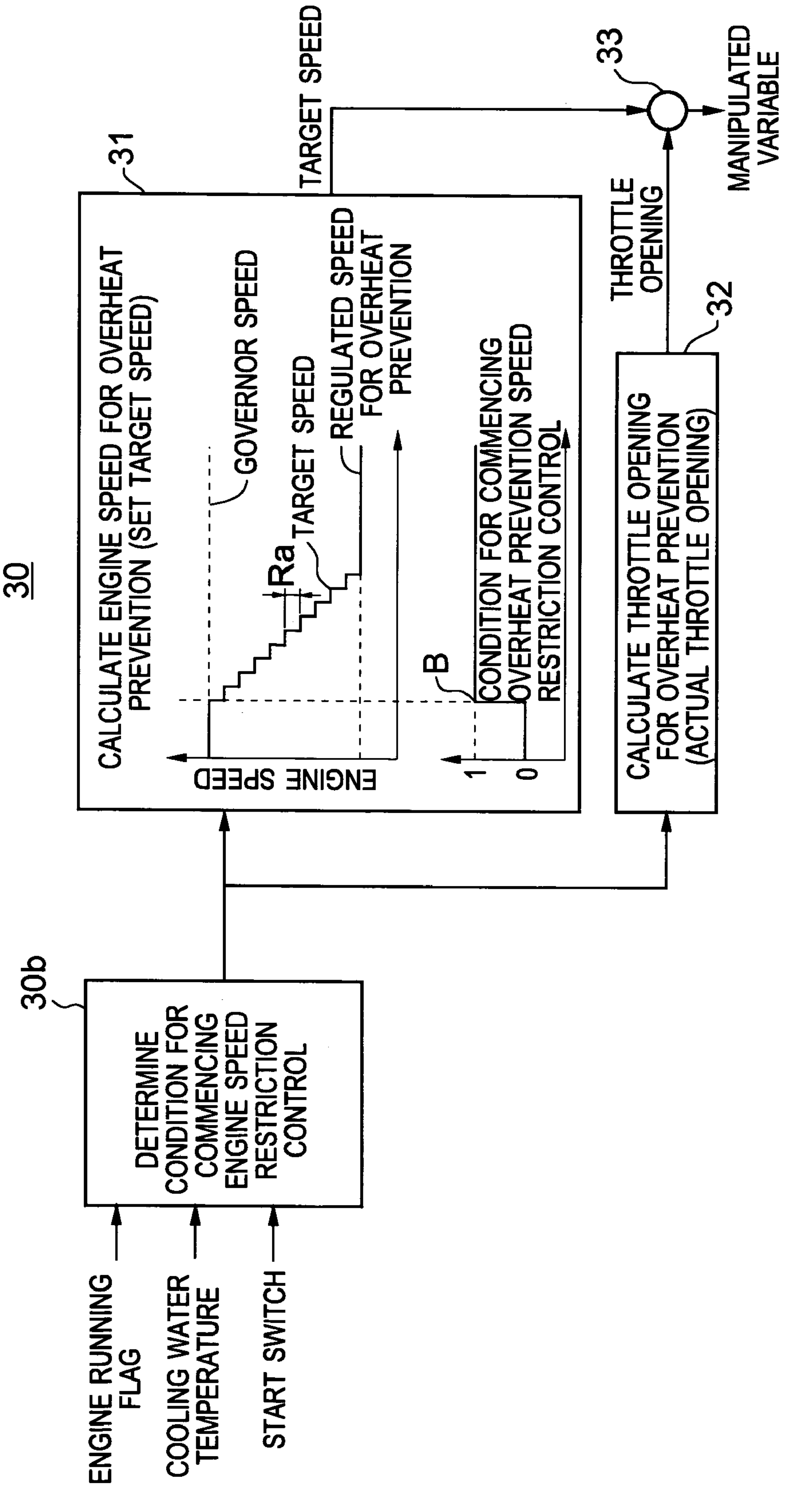
FIG. 4 is a block diagram of a main portion of the control apparatus shown in FIG. 2.
Figure 5:
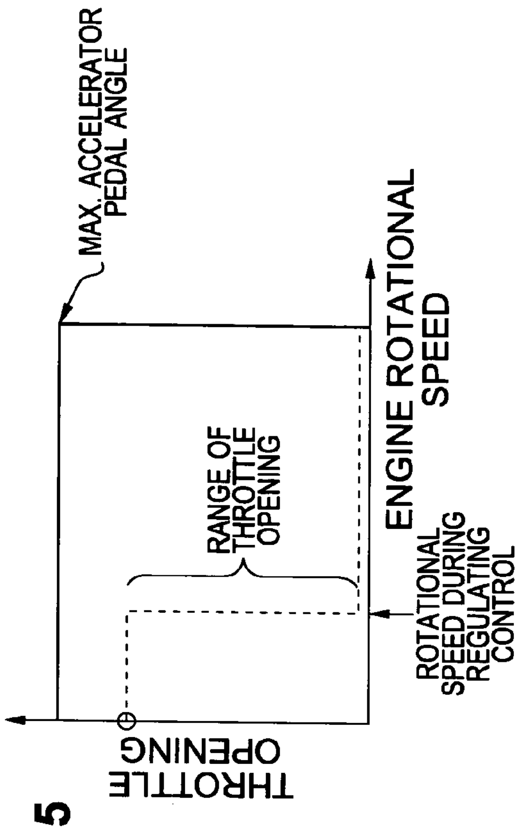
FIG. 5 is a graphic representation showing a throttle opening range of an electronic control throttle in the governor rotation control method for preventing overheat.

Further, the governor rotation control apparatus for preventing overheat will be described in more detail with reference to FIGS. 3 and 4. The governor rotation control apparatus in the illustrated embodiment is constituted by the control apparatus 30. First, a description will be given of a timing chart shown in FIG. 3. FIG. 3(*a*) shows the temperature of the engine cooling water in the engine 10 and a water temperature level for preventing overheat or an overheat judging water temperature which is indicated by broken line in FIG. 3 (*a*). FIG. 3 (*b*) shows a control start timing or a flag of the condition for commencing the restriction of the engine rotational speed is set to reduce the engine rotational speed so as to prevent overheat of the engine 10. FIG. 3(*c*) shows an engine start timing and running of the engine. FIG. 3(*d*) shows an operation of a start switch. FIG. 3(*e*) shows the throttle opening of the electronic control throttle 20. FIG. 3(*f*) shows the engine rotational speed and a target engine rotational speed for preventing overheat.

First, when the start switch is turned on at time to (FIG. 3(*d*)), the engine 10 begins a starting operation and the engine rotational speed begins to increase at time $t_0$ (FIG. 3(*f*)). The throttle valve 21 of the electronic control throttle 20 is opened with predetermined timing and the throttle opening is increased (FIG. 3 (*e*)) . Then, the intake air flows into the engine 10 and the engine 10 starts, and the air fuel ratio is adjusted to a predetermined value. The temperature of the engine cooling water in the engine 10 is increased step by step. The temperature of the engine cooling water which is detected by the water temperature detecting means 30*a* reaches the predetermined water temperature or overheat judging water temperature A at which overheat is likely to occur, for example, at time $t_3$ (FIG. 3(*a*)). The determining means 30*b* first flags or stores that the engine is running, and then it stores that a predetermined time period Tb (time period from time $t_1$, to time $t_2$) has lapsed from an on state of the start switch. Further, when a predetermined time period or control start delay Ta has lapsed after reaching the predetermined water temperature A, the determining means 30*b* determines that the condition for commencing restriction of the engine rotational speed for overheat prevention is satisfied at time $t_4$ and outputs a rotational speed restriction commencement signal B (FIG. 3(*b*)).

The rotational speed restriction commencement signal B is input to the throttle opening control means 30*c*, whereby the throttle opening control means 30*c* sets the engine rotational speed to a target engine rotational speed or a regulated rotational speed for overheat prevention. The throttle opening control means 30*c* includes an engine rotational speed calculating means 31 for calculating an engine rotational speed for overheat prevention, a throttle opening calculating means 32 for calculating an actual throttle opening, and a comparing means 33, as shown in FIG. 4. The engine rotational speed calculating means 31 calculates a target rotational speed for overheat prevention in accordance with an arithmetic process. The throttle opening calculating means 32 arithmetically processes the output from the crank angle sensor 9 to calculate a current actual engine rotational speed. The actual engine rotational speed of the engine 10 and the target engine rotational speed are compared by the comparing means 33, whereby the throttle opening of the throttle valve 21 in the electronic control throttle 20 is throttled stepwise so that the actual engine rotational speed is lowered step by step. The target engine rotational speed is controlled by placing a restriction on a change amount Ra so that the engine rotational speed is lowered at intervals of, for example, 100 ms.

In the illustrated embodiment, in the overheat prevention control mode, the fuel injection mode is different from the normal fuel injection mode. More particularly, the actual throttle opening of the electronic control throttle 20 is controlled to limit the maximum throttle opening even if the accelerator pedal angle is made maximum by operating the accelerator pedal 40, as indicated by broken line in FIG. 5, whereby the flow rate of the intake air fed into the engine 10 is regulated. Accordingly, the temperature of the engine cooling water is lowered step by step, resulting in the engine 10 being prevented from overheating. Further, in the overheat prevention control mode, unlike in the idle state, the throttle valve is not completely closed, so that the cargo handling vehicle can carry out a traveling work and/or a cargo handling work.

As described above, in accordance with the embodiment of the present invention, in the case where the predetermined condition is satisfied by constantly monitoring the temperature of the engine cooling water and detecting the overheat judging water temperature which has been set as desired, the throttle opening of the electronic control throttle is adjusted in such a manner as to lower the engine rotational speed step by step. Accordingly, there are advantages that the engine does not overheat and that the driver can carry out the traveling work or the cargo handling work without bewaring of overheat of the engine.

Further, in accordance with the embodiment of the present invention, the engine rotational speed is controlled by throttling the throttle opening of the electronic control throttle stepwise in such a manner as to lower the engine rotational speed before the engine overheats. Accordingly, since overheat of the engine per se is avoided, there are advantages that the engine sustains no damage and that it is possible to avoid the halting of the cargo handling work due to the overheat of the engine.

Next, a description will be given of an embodiment of an engine protection control method at a low fuel pressure in accordance with the present invention with reference to FIGS. 6 to 9 as well as FIG. 1.

In this embodiment, the fuel injection valve or fuel injector 17 is disposed in an intake passage on an upstream side of the collector portion of the intake manifold 18 of the engine 10, so that the petroleum gas fuel is supplied to a plurality of cylinders of the engine 10 by fuel injection from the fuel injector 17, as shown in FIG. 1.

Figure 6:
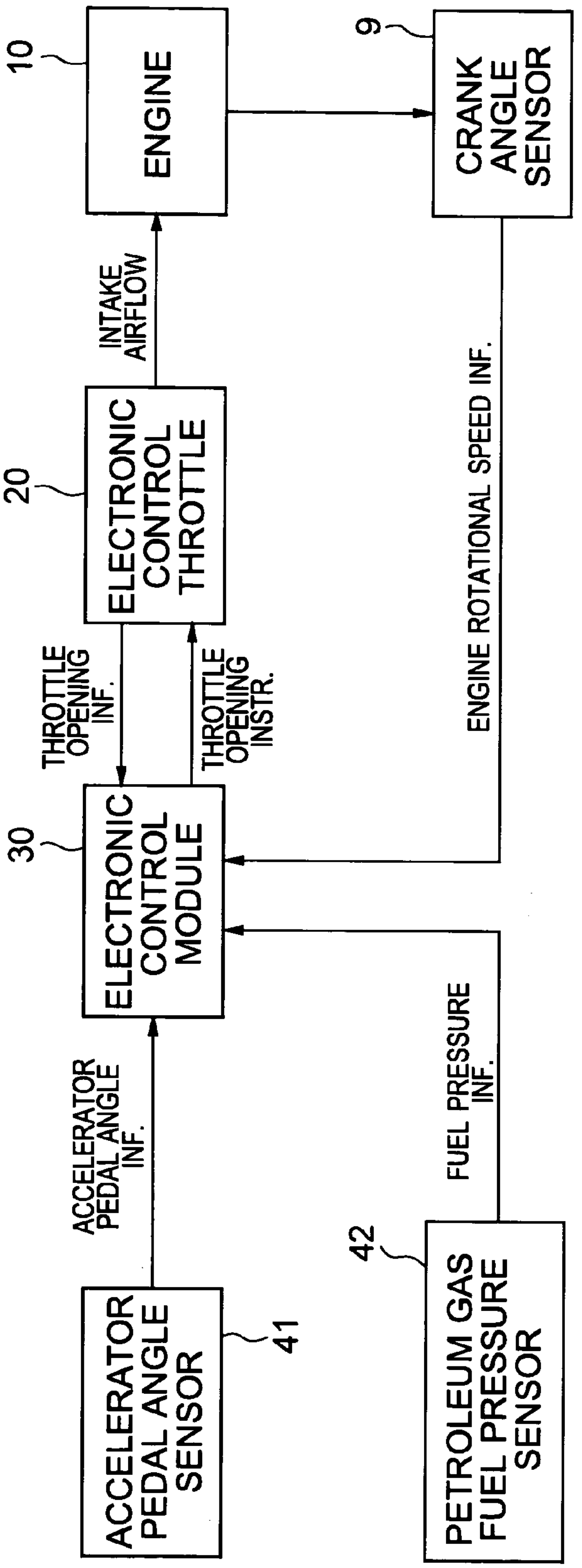
FIG. 6 is a block diagram showing another example of a control apparatus for executing an engine protection control method at a low fuel pressure in accordance with the present invention.

In this embodiment, the control, as shown in FIG. 6, is carried out in such a manner that the electronic control module or engine control apparatus 30 receives engine rotational speed information obtained by the crank angle sensor 9 arranged in the engine 10, fuel pressure information obtained by the petroleum gas fuel pressure sensor 42, throttle opening information outputted from the throttle position sensor 22 arranged in the electronic control throttle 20, accelerator pedal angle information obtained by the accelerator pedal angle sensor 41 arranged in the accelerator pedal 40, and the like, to thereby control the throttle opening of the electronic control throttle 20 so as to limit the rotational speed of the engine 10 to a low rate in the case where the pressure of the petroleum gas fuel is equal to or less than a predetermined level.

Figure 7:
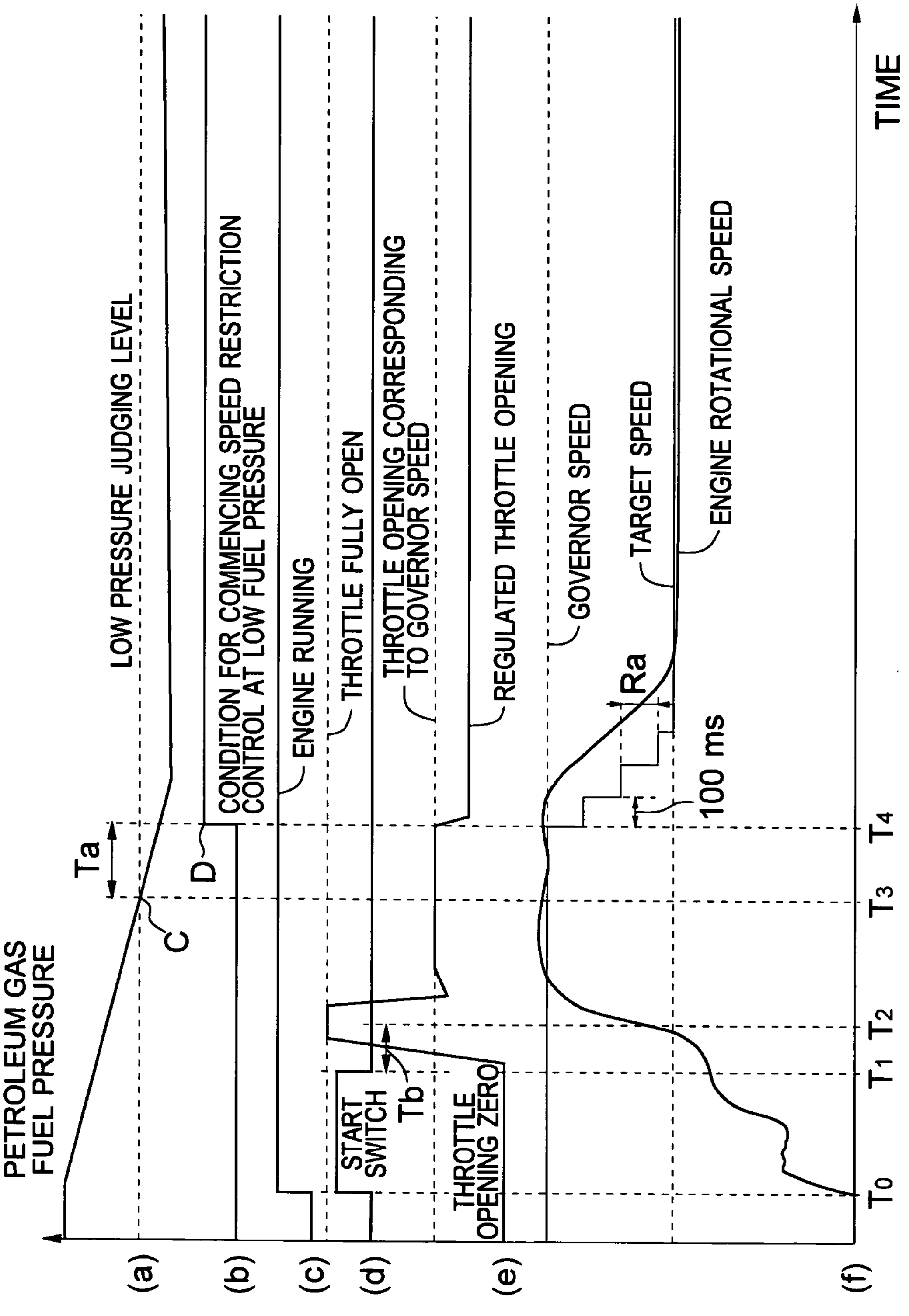
FIG. 7 is a timing chart showing the engine protection control method at a low fuel pressure in accordance with the present invention.
Figure 8:
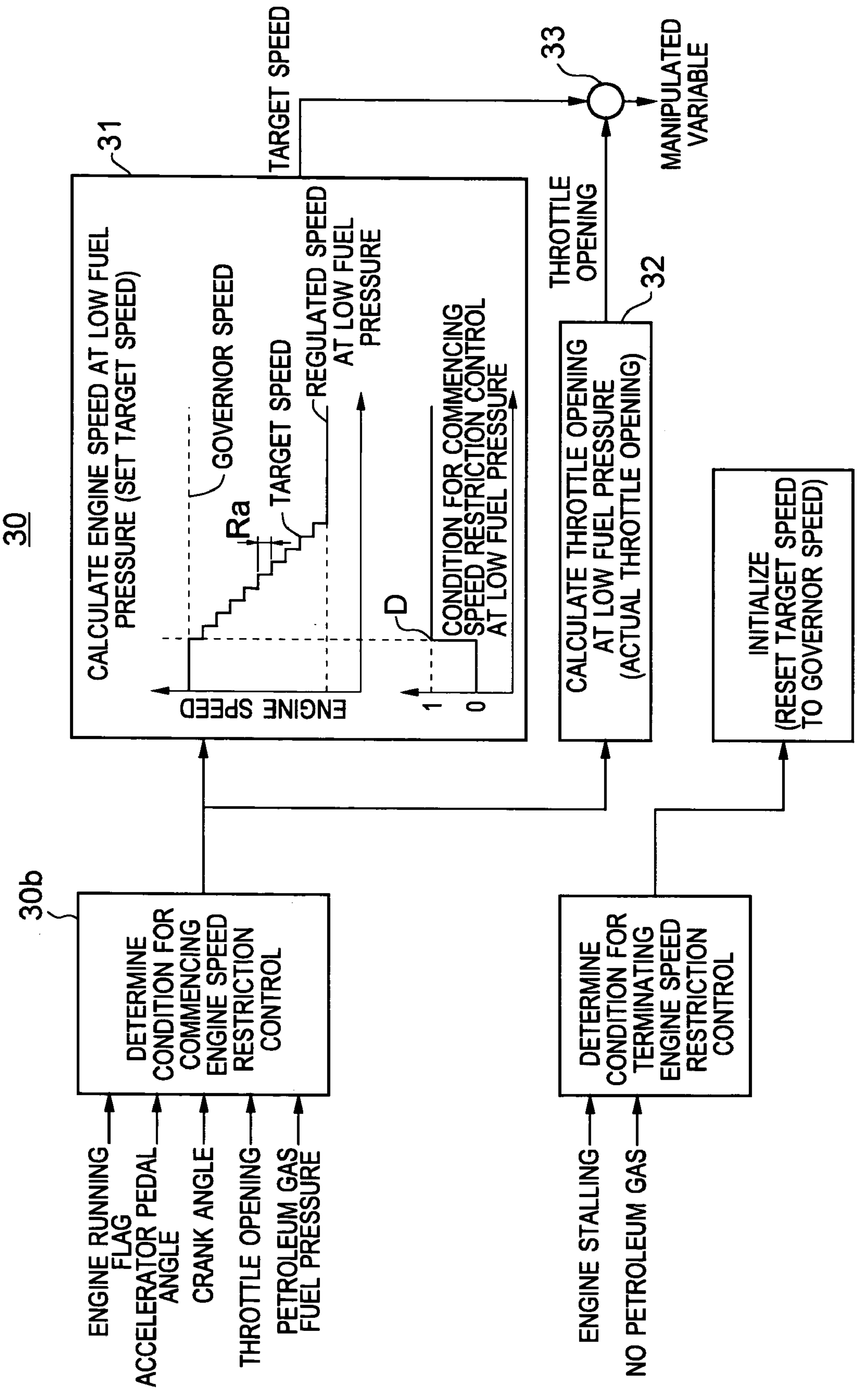
FIG. 8 is a block diagram showing a main portion of the control apparatus shown in FIG. 6.
Figure 9:
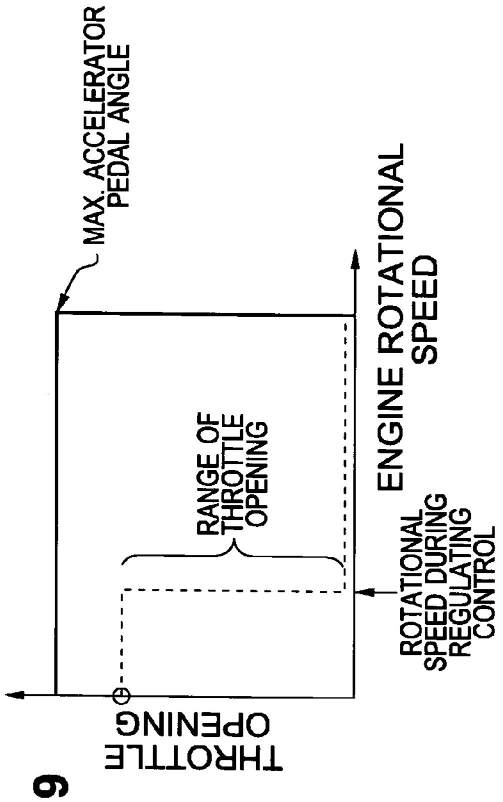
FIG. 9 is a view showing a relation between an accelerator pedal opening and a throttle opening.

In the actual control, as shown in FIGS. 8 and 9, the fuel pressure of the petroleum gas is monitored and the control apparatus 30 determines, on the basis of the information mentioned above, whether or not the fuel pressure of the petroleum gas is at a low fuel pressure level, whereby a control start condition is calculated. More specifically, a throttle opening control is executed when it is flagged (indicated at D in FIG. 7(*b*)) that a condition for commencing restriction of the engine rotational speed at a low fuel pressure is satisfied after a control start delay Ta has lapsed from the time of the fuel pressure of the petroleum gas reaching a low fuel pressure judging level C, for example, 0.26 $kgf/cm^2$ (FIG. 7(*a*)). A target throttle opening of the electronic control throttle 20 is changed on the basis of the fuel pressure of the petroleum gas, and a regulated throttle opening of the electronic control valve 20 at a low fuel pressure is calculated from the fuel pressure value. Concurrently, a target rotational speed of the engine 10 at a low fuel pressure is calculated.

Thereafter, the throttle opening of the electronic control throttle 20 is made to become a predetermined value regardless of the accelerator pedal angle of the accelerator pedal 40 as indicated by broken line in FIG. 9 so as to limit the intake air amount. In the case where the throttle opening of the electronic control throttle 20 is rapidly closed and the engine rotational speed is rapidly reduced, there is a possibility that an unexpected occurrence is generated. Accordingly, the throttle opening of the electronic control throttle 20 is reduced stepwise to the target throttle opening or regulated throttle opening corresponding to a target rotational speed of the engine 10 at a low fuel pressure. In practice, the engine rotational speed is reduced at every interval of 100 ms.

An engine rotational speed regulation control is executed on the basis of the calculated target throttle opening of the electronic control throttle 20 and the target rotational speed of the engine 10 at a low fuel pressure.

This control is terminated in the case where the control apparatus 30 determines that an engine stall, no fuel or the like is generated, and then an initializing process is executed to make the target rotational speed become a governor rotational speed.

A description will be further given in more detail on the basis of a timing chart shown in FIG. 7. The start switch is turned on at time $T_0$ and the engine 10 starts rotating, and at time $T_1$, the accelerator pedal 40 is depressed down to make the throttle 20 start opening, so that the rotational speed of the engine 10 is increased. In the case where the fuel pressure of the petroleum gas decreases and reaches the predetermined low fuel pressure level or low pressure judging level C at time $T_3$, such a low fuel pressure state is confirmed at time $T_4$ after a control start delay Ta has lapsed, whereby it is flagged that the condition for commencing restriction of the engine rotational speed at a low fuel pressure is satisfied. Accordingly, the throttle opening of the throttle 20 is regulated so that the engine rotational speed becomes the regulated rotational speed at a low fuel pressure.

As described above, in accordance with the embodiment of the present invention, the control method is so constructed that the throttle opening of the electronic control throttle is regulated to limit the engine rotational speed to a low rate in the case where the engine control apparatus receives the information in regard to the engine rotational speed, the fuel pressure, the throttle opening and the accelerator pedal angle, and the fuel pressure becomes equal to or less than a predetermined pressure. Such construction can prevent the fuel from becoming lean, to thereby protect the engine and prevent the catalyst within the exhaust pipe from being damaged.

Figure 10:
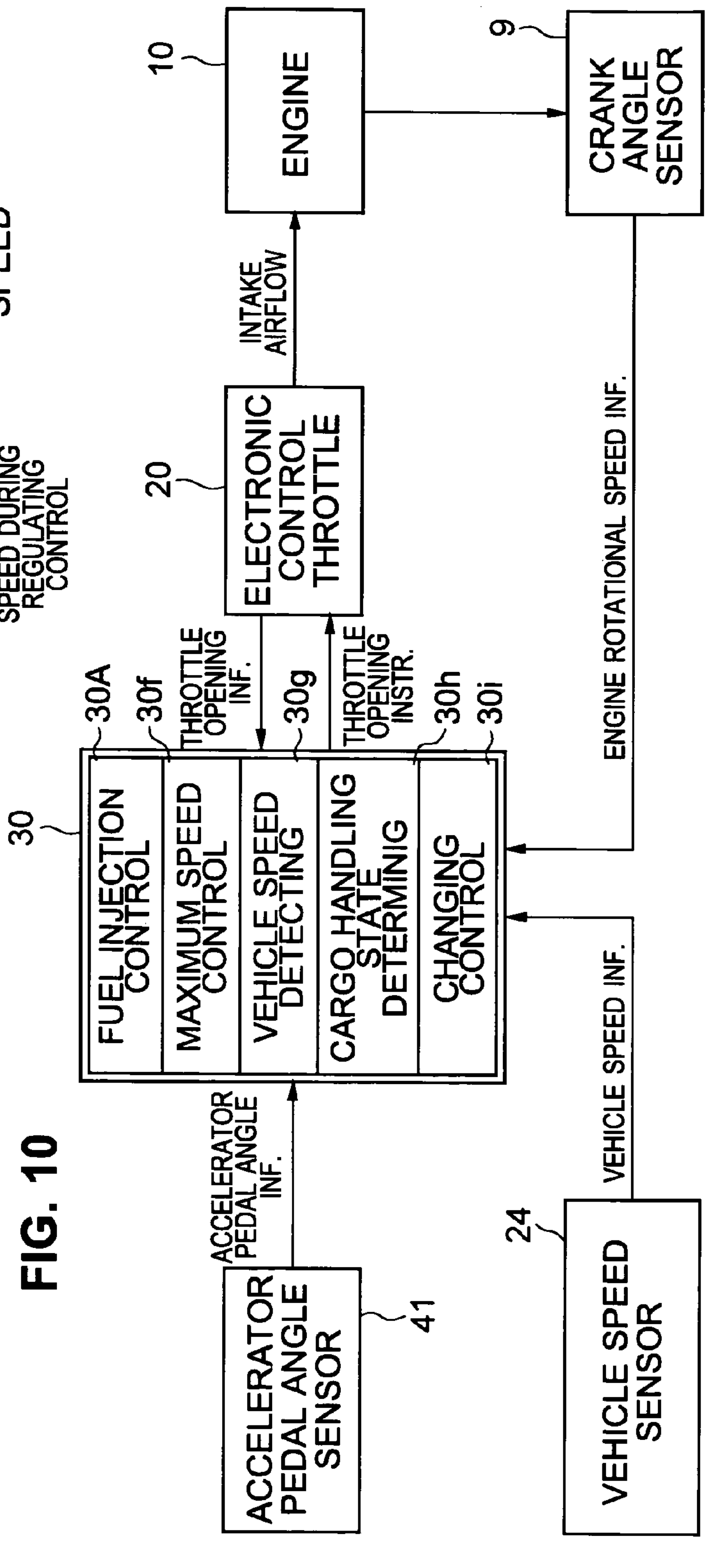
FIG. 10 is a block diagram showing an embodiment of an engine power control apparatus for a cargo handling vehicle in accordance with the present invention.
Figure 11A:
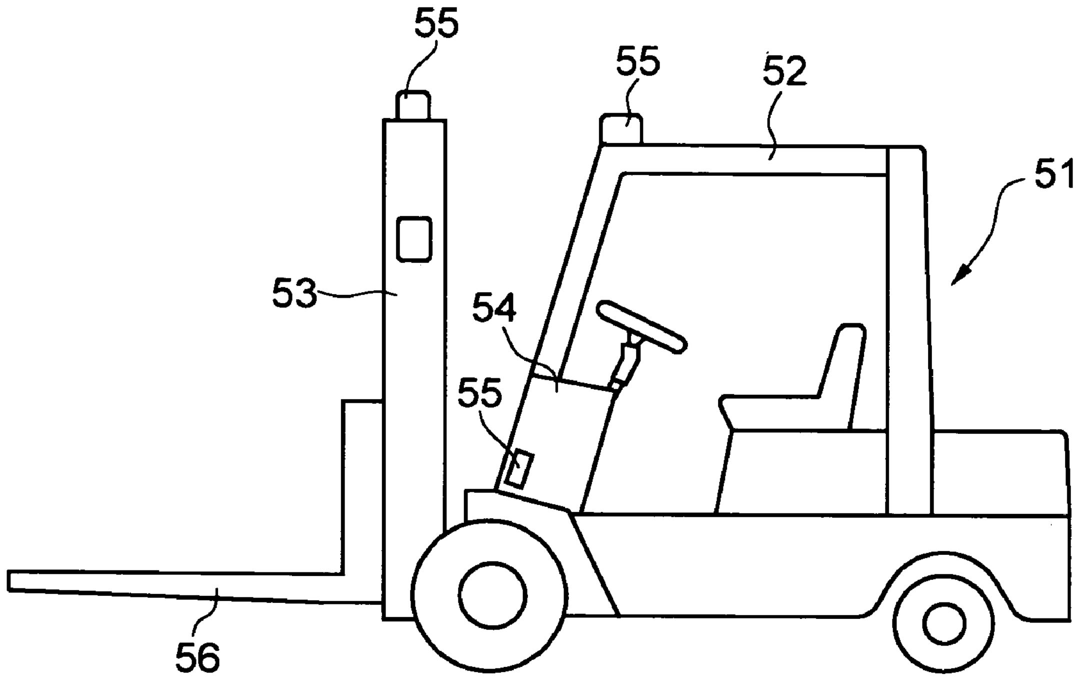
FIG. 11A PRIOR ART
FIG. 11A is a schematic side elevational view of a conventional cargo handling vehicle.
Figure 11B:
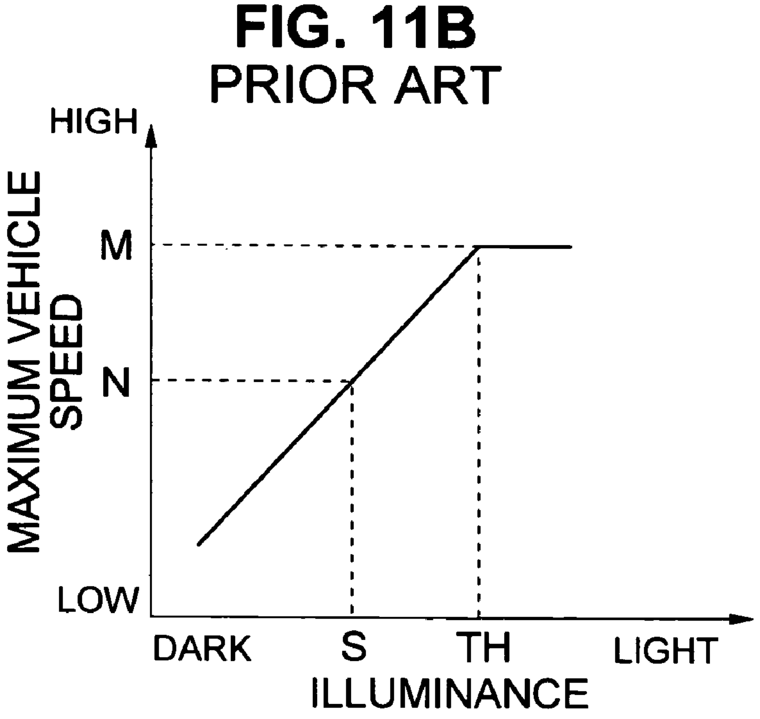
FIG. 11B PRIOR ART
FIG. 11B is a graph illustrating a limit of a maximum speed in correspondence to illuminance in a cargo handling yard and at a time of traveling.

Next, a description will be given of an embodiment of an engine output control apparatus for a cargo handling vehicle in accordance with the present invention with reference to FIGS. 1 and 10.

In the illustrated embodiment, the control apparatus 30 is provided with the fuel injection control means 30A, and is also provided with another control means, namely a maximum speed control means 30*f*, a vehicle speed detecting means 30*g*, a cargo handling state determining means 30*h*, and a changing control means 30*i*. The maximum speed control means 30*f* has a control function of controlling the maximum speed so as not to exceed a predetermined speed in the case of traveling on the premises or yard and in the case where the cargo handling yard is dark, whereby the vehicle speed is not permitted to exceed the predetermined speed even when the driver operates the accelerator pedal 40.

The vehicle speed detecting means 30*g* is adapted to count the rotation signal inputted to the control apparatus 30 from the vehicle speed sensor 24 and arithmetically process the vehicle speed. The cargo handling state determining means 30*h* automatically determines that the cargo handling vehicle is in a cargo handling state in the case of detecting that the vehicle speed corresponding to the output on the basis of the vehicle speed detecting means 30*g* is at zero, and outputs a cargo handling detection signal. In this case, the cargo handling detection signal is output in a state where the cargo handling vehicle stops. The cargo handling detection signal is input to the changing control means 30*i*, so that the changing control means 30*i* releases the control function of the maximum speed control means 30*f* on the basis of a switching signal, to thereby increase the rotational speed of the engine 10 and control a shaft torque of the engine 10 to become maximum.

More specifically, the control is executed in such a manner that the maximum speed control means 30*f* is released from regulating the throttle opening of the electronic control throttle 20 and the accelerator pedal 40 is operated by the driver, so that the throttle opening of the electronic control throttle 20 becomes maximum, to thereby make the amount of the intake air into the engine 10 maximum so as to increase the engine rotational speed, resulting in the shaft torque of the engine 10 being made maximum. Further, when the cargo handling work is finished by operating the cargo handling lever 4, the function of the maximum speed control means 30*f* is restored on the basis of the switching control means 30*i*.

In accordance with the present embodiment, a logic is so constructed that the cargo handling state determining means 30*h* determines that in the case of the vehicle speed of the cargo handling vehicle being zero, the vehicle is in the cargo handling state, wherein the control function of the maximum speed control means 30*f* is released and the throttle opening of the electronic control throttle 20 is controlled to become maximum in correspondence to the operation of the accelerator pedal 40, so that the shaft torque of the engine 10 becomes maximum, resulting in no obstruction being generated in the cargo handling work. In this case, the cargo handling work may be determined at the time when the cargo handling lever 4 is operated while the vehicle speed of the cargo handling vehicle is zero, to thereby release the control function of the maximum speed control means 30*f*.

Further, in the present embodiment, the maximum speed control means may include means for regulating the maximum speed in correspondence to an illuminance of the cargo handling yard and that during traveling. Accordingly, the regulation is released under a certain condition that the cargo handling work is started, to thereby control the shaft torque of the engine to become maximum.

As described above, in accordance with the embodiment of the present invention, the control is executed in such a manner that even in the case where the maximum speed is regulated, the throttle opening of the electronic control throttle becomes maximum, so that the shaft torque of the engine becomes maximum at the time of the cargo handling work. Accordingly, there is an advantage that a shortage of output power of the engine at the time of the cargo handling work can be solved.

Further, in accordance with the embodiment of the present invention, there is an advantage that the cargo handling work is automatically determined without manually releasing the regulation of the maximum speed, resulting in the cargo handling work being easily carried out.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A method of protecting an engine which is provided with an electronic control fuel injection system, comprising the steps of:

detecting a quasi-abnormality of at least one of variables in connection with the engine and parts associated with the engine;

when the quasi-abnormality of the at least one of the variables is detected and lasts for a predetermined period of time, regulating a throttle opening of an electronic control throttle, to thereby limit an engine rotational speed to a low rate, wherein, the at least one of the variables is a temperature of an engine cooling water, the quasi-abnormality thereof is a state that the temperature of the engine cooling water is not less than a predetermined temperature; and freeing the regulation of the throttle opening of the electronic control throttle when an abnormality of cooling water has been avoided, so that a control mode is changed over to a fuel injection control using the electronic control fuel injection system.

2. A method of protecting an engine which is provided with an electronic control fuel injection system, comprising the steps of:

detecting a quasi-abnormality of at least one of variables in connection with the engine and parts associated with the engine; and when the quasi-abnormality of the at least one of the variables is detected and lasts for a predetermined period of time regulating a throttle opening of an electronic control throttle to thereby limit an engine rotational speed to a low rate;

wherein the at least one of the variables is a fuel pressure, and the quasi-abnormality thereof is a state that the fuel pressure is equal to or less than a predetermined pressure.

3. A method of protecting an engine from overheating, which engine is provided with an electronic control fuel injection system, comprising the steps of:

detecting a temperature of an engine cooling water and judging whether or not the detected temperature is equal to or higher than a predetermined temperature; and when the detected temperature is equal to or higher than the predetermined temperature and such a high temperature state lasts for a predetermined period of time regulating a throttle opening of an electronic control throttle, to thereby limit an engine rotational speed to a predetermined low rate;

wherein the method further comprises the step of freeing the regulation of the throttle opening of the electronic control throttle when an abnormality of the temperature of the engine cooling water has been avoided, so that a control mode is changed over to fuel injection control using the electronic control fuel injection system.

4. A method of protecting an engine at a low fuel pressure, in which engine a fuel injector is disposed in an air intake passage on an upstream side of a collector portion of an intake manifold of the engine so that a petroleum gas fuel is supplied to a plurality of cylinders of the engine by fuel injection from the fuel injector, and an electronic control throttle is disposed in the air intake passage, comprising the steps of:

receiving information in regard to an engine rotational speed, a fuel pressure, a throttle opening, and an angle of an accelerator pedal by means of an engine control unit; and when the fuel pressure becomes equal to or less than a predetermined pressure, regulating a throttle opening of the electronic control throttle, to thereby limit the engine rotational speed to a low rate.

5. An engine power control method for a cargo handling vehicle including an engine which is provided with an electronic control throttle so as to regulate a throttle opening of the electronic control throttle, to thereby restrain a maximum speed of the vehicle, the method comprising the steps of:

detecting a speed of the vehicle;

determining, based on the detected speed of the vehicle, whether the vehicle is in a cargo handling state, wherein it is determined that the vehicle is in the cargo handling state when the detected speed of the vehicle is at zero; and releasing the regulation of the throttle opening of the electronic control throttle when it has been determined that the cargo handling vehicle is in the cargo handling state, to thereby maximize a shaft torque of the engine.

6. A protecting apparatus for an engine at a low fuel pressure, in which engine a fuel injector is disposed in an air intake passage on an upstream side of a collector portion of an intake manifold of the engine so that a petroleum gas fuel is supplied to a plurality of cylinders of the engine by fuel injection from the fuel injector, and an electronic control throttle is disposed in the air intake passage, the apparatus comprising:

an engine speed detecting means for detecting an engine rotational speed;

a pressure sensor for detecting a pressure of the petroleum gas fuel supplied to the fuel injector;

a throttle position sensor for detecting a throttle opening of the electronic control throttle;

an accelerator pedal angle sensor disposed on an accelerator pedal of the engine; and an engine control unit connected to the engine speed detecting means, pressure sensor, throttle position sensor and accelerator pedal angle sensor, for receiving information in regard to the engine rotational speed, the fuel pressure, the throttle opening, and the angle of the accelerator pedal;

wherein when the fuel pressure detected by the pressure sensor becomes equal to or less than a predetermined pressure, the engine control unit regulates the throttle opening of the electronic control throttle, to thereby limit the engine rotational speed to a low rate.

7. An apparatus for protecting an engine from overheating, comprising:

an electronic control fuel injection system including an electronic control throttle;

a detecting means for detecting a temperature of an engine cooling water;

a judgment means for judging whether or not the temperature detected by the detecting means is equal to or higher than a predetermined temperature and such a high temperature state lasts for a predetermined period of time, to thereby determine a condition for commencing restriction of an engine rotational speed;

a throttle opening control means for regulating a throttle opening of the electronic control throttle so as to make an actual rotational speed of the engine reach an overheat preventing rotational speed when the condition for commencing the restriction of the engine rotational speed is established; and a changing means for releasing the throttle opening control means from the regulation of the throttle opening of the electronic control throttle and changing over a control mode to fuel injection control using the electronic control fuel injection system when an abnormality of the temperature of the engine cooling water has been avoided by the throttle opening control means in such a manner that the throttle opening is regulated to reduce a flow rate of an intake airflow and decrease the engine rotational speed to the overheat preventing rotational speed.

8. The apparatus as defined in claim 7, further comprising an engine rotational speed detecting means for detecting an actual rotational speed of the engine;

wherein the throttle opening control means is adapted to regulate the throttle opening of the electronic control throttle in such a manner that the overheat preventing rotational speed is set to a target rotational speed to which the actual rotational speed of the engine detected by the engine rotational speed detecting means is set.

9. An engine power control apparatus for a cargo handling vehicle including an engine which is provided with an electronic control throttle so as to regulate a throttle opening of the electronic control throttle, to thereby restrain a maximum speed of the vehicle, the apparatus comprising:

a speed detecting means for detecting a speed of the vehicle; and a determining means for determining, based on an output of the speed detecting means, whether the vehicle is in a cargo handling state, wherein the determining means determines that the vehicle is in the cargo handling state when the output of the speed detecting means indicates the speed of the vehicle is at zero, wherein when the determining means determines that the cargo handling vehicle is in the cargo handling state, the regulation of the throttle opening of the electronic control throttle is released so as to maximize a shaft torque of the engine.

10. The engine power control apparatus as defined in claim 9, further comprising:

a maximum speed control means for controlling the throttle opening of the electronic control throttle to restrain the maximum speed of the vehicle; and a changing and controlling means for releasing the maximum speed control means from restraining of the maximum speed of the vehicle when the determining means determines that the cargo handling vehicle is in the cargo handling state, so that the regulation of the throttle opening of the electronic control throttle is released.

* * * * *